(12) United States Patent
Groz (10) Patent No.: US 11,654,552 B2
(45) Date of Patent: May 23, 2023

(54) BACKUP CONTROL BASED CONTINUOUS TRAINING OF ROBOTS

(71) Applicant: TruPhysics GmbH, Stuttgart (DE)

(72) Inventor: Albert Groz, Stuttgart (DE)

(73) Assignee: TruPhysics GmbH, Stuttgart (DE)

(*) Notice: Subject to any disclaimer, the term of this patent is extended or adjusted under 35 U.S.C. 154(b) by 183 days.

(21) Appl. No.: 16/942,640

(22) Filed: Jul. 29, 2020

(65) Prior Publication Data

US 2021/0031364 A1 Feb. 4, 2021

Related U.S. Application Data (60) Provisional application No. 62/879,723, filed on Jul. 29, 2019.

(51) Int. Cl.
*B25J 9/16* (2006.01)
*G06T 1/00* (2006.01)

(52) U.S. Cl.
CPC .............. *B25J 9/161* (2013.01); *B25J 9/163* (2013.01); *B25J 9/1689* (2013.01); *G06T 1/0014* (2013.01); *G05B 2219/33034* (2013.01); *G05B 2219/33056* (2013.01); *G05B 2219/40153* (2013.01)

(58) Field of Classification Search
CPC .......... B25J 9/161; B25J 9/163; B25J 9/1689; G05B 2219/33034; G05B 2219/33056; G05B 2219/40153
See application file for complete search history.

(56) References Cited

U.S. PATENT DOCUMENTS

| | | | | |
|---|---|---|---|---|
| 9,465,388 | B1 * | 10/2016 | Fairfield | G05D 1/0044 |
| 9,687,983 | B1 * | 6/2017 | Prats | G06V 20/58 |
| 9,796,093 | B2 * | 10/2017 | Mascorro Medina | B25J 11/008 |
| 9,886,841 | B1 * | 2/2018 | Nave | B60W 10/04 |
| 10,102,430 | B2 * | 10/2018 | Vunic | G06V 20/40 |
| 10,807,593 | B1 * | 10/2020 | Nave | B60K 28/14 |
| 11,263,025 | B2 * | 3/2022 | Noorshams | G06N 5/022 |
| 2002/0124041 | A1 * | 9/2002 | Zack | G06F 1/14 718/102 |

(Continued)

OTHER PUBLICATIONS

Nwankpa et al. Activation Functions: Comparison of Trends in Practice and Research for Deep Learning, arXiv preprint arXiv: 1811.03378 (Year: 2018).*

*Primary Examiner* — Ryan Rink
(74) *Attorney, Agent, or Firm* — Georgiy L. Khayet (57) ABSTRACT

Provided are systems and methods for training a robot. The method commences with collecting, by the robot, sensor data from a plurality of sensors of the robot. The sensor data may be related to a task being performed by the robot based on an artificial intelligence (AI) model. The method may further include determining, based on the sensor data and the AI model, that a probability of completing the task is below a threshold. The method may continue with sending a request for operator assistance to a remote computing device and receiving, in response to sending the request, teleoperation data from the remote computing device. The method may further include causing the robot to execute the task based on the teleoperation data. The method may continue with generating training data based on the sensor data and results of execution of the task for updating the AI model.

18 Claims, 8 Drawing Sheets

(56) References Cited

U.S. PATENT DOCUMENTS

| | | | | |
|---|---|---|---|---|
| 2007/0250212 | A1* | 10/2007 | Halloran | A47L 9/009 901/1 |
| 2009/0326709 | A1* | 12/2009 | Hooper | G06F 16/93 700/245 |
| 2011/0264305 | A1* | 10/2011 | Choe | G05D 1/0246 701/28 |
| 2012/0209569 | A1* | 8/2012 | Becourt | G01H 1/14 702/183 |
| 2013/0085625 | A1* | 4/2013 | Wolfe | G05B 23/0272 701/1 |
| 2014/0207282 | A1* | 7/2014 | Angle | G06Q 10/1095 901/1 |
| 2015/0106010 | A1* | 4/2015 | Martin | G08G 1/096741 701/410 |
| 2015/0148949 | A1* | 5/2015 | Chin | B05D 1/02 700/245 |
| 2015/0150429 | A1* | 6/2015 | Yoo | A47L 11/4011 173/4 |
| 2015/0193982 | A1* | 7/2015 | Mihelich | H04W 4/029 345/633 |
| 2015/0321350 | A1* | 11/2015 | Mian | B25J 9/16 700/245 |
| 2015/0339570 | A1* | 11/2015 | Scheffler | G06N 3/10 706/27 |
| 2016/0023351 | A1* | 1/2016 | Kuffner | B25J 9/0084 901/47 |
| 2016/0167226 | A1* | 6/2016 | Schnittman | G06T 7/55 901/1 |
| 2016/0180239 | A1* | 6/2016 | Frankel | G06V 40/172 706/12 |
| 2016/0189310 | A1* | 6/2016 | O'Kane | G06Q 40/08 705/4 |
| 2016/0266577 | A1* | 9/2016 | Kerzner | G08B 13/22 |
| 2016/0282862 | A1* | 9/2016 | Duffley | A47L 11/4011 |
| 2016/0374527 | A1* | 12/2016 | Yoo | G05D 1/027 180/209 |
| 2017/0123422 | A1* | 5/2017 | Kentley | B60L 15/20 |
| 2017/0225336 | A1* | 8/2017 | Deyle | B25J 5/007 |
| 2017/0227647 | A1* | 8/2017 | Baik | G01S 19/48 |
| 2018/0147721 | A1* | 5/2018 | Griffin | G05D 1/0274 |
| 2018/0150783 | A1* | 5/2018 | Xu | G06Q 10/0633 |
| 2018/0286056 | A1* | 10/2018 | Kaino | G06T 7/246 |
| 2019/0019349 | A1* | 1/2019 | Dolgov | G05D 1/0044 |
| 2019/0090472 | A1* | 3/2019 | Crinklaw | A01B 69/008 |
| 2020/0171671 | A1* | 6/2020 | Huang | G06N 3/08 |
| 2021/0008714 | A1* | 1/2021 | Griffin | A47L 9/2889 |
| 2021/0031364 | A1* | 2/2021 | Groz | B25J 9/161 |
| 2021/0089040 | A1* | 3/2021 | Ebrahimi Afrouzi | A47L 9/2894 |

* cited by examiner

BACKUP CONTROL BASED CONTINUOUS TRAINING OF ROBOTS

CROSS-REFERENCE TO RELATED APPLICATIONS

This application claims the benefit of U.S. provisional patent application Ser. No. 62/879,723 filed Jul. 29, 2019, entitled "Training Robots Using Imitation and Reinforcement Machine Learning." The subject matter of aforementioned application is incorporated herein by reference in its entirety for all purposes.

TECHNICAL FIELD

This disclosure relates generally to training robots and, more specifically, to backup control based continuous training of robots.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

The worldwide market size for installed industrial robots and homecare and eldercare robots is growing rapidly. Currently, solutions are predicated for defined picking environments, known products, and specific placement locations. Intelligent algorithms are crucial in creating smart robots and empowering them to solve tasks by handling known and unknown objects in uncertain environments. Intelligent robotic programs are created using tools for generation of scalable and reliable training data. However, there is a need for fallback strategies in case of failures of artificial intelligence (AI) skills during specific steps performed by robots.

Native robot programming approaches are commonly used by robot control developers. By using teaching pendants and Human Machine Interfaces (HMIs), the programs can be written directly on a robot controller personal computer (PC) in a native robot programming language and run/tested directly on the physical robot. Existing common solutions can utilize, for example, Kuka KRC4, Kuka Sunrise, Universal Robot URScript, and so forth. These programs are often hardcoded and do provide flexibility in random picking of objects.

In offline simulation, if tasks are more complex (especially if multiple signals are required, e.g., in automation), the programs including paths, signals, and tasks can be precisely developed on a computer-aided engineering (CAD) constructed environment in an offline approach. Without connection to a real robot controller PC, the robot programs are generated and exported to the native robot language. Solutions include Dassault Systems Delmia, Siemens Tecnomatics, ArtiMinds. However, these solutions do not support flexible tasks (e.g., in logistical random selection).

With AI solutions, some companies have tried to develop machine learning driven program generation. These programs allow solving individual tasks by using dynamic motions that are trained through imitation and reinforcement learning. Training data for machine learning comes from real robot movement through learning, using an approach where users are guiding the robot manually up to 400× times. Another approach is to track new types of HMI devices, like smart gloves, and record human behaviors to solve tasks. The first suppliers for machine learning-driven solutions include Micropsi industries and GESTALT Robotics. Both are facing challenges due to the lack of training data and scalability.

For augmented reality (AR) Service, the market of documentation software is currently dominated by videos, live trainings, and auto-generated instructions from CAD systems (e.g., Solid Works). In most companies, assembly and reparation instructions are documented and archived as Portable Document Format (PDF) documents or in file orders.

Lately, new products appeared on the market in the field of AR. These products are focusing on the niche of guiding technicians in real-time by detecting the objects and overlapping 3-dimensional (3D) holograms related to the instruction steps. This approach has several disadvantages. First, it is difficult to create animated 3D content and tracking of objects requires considerable computational performance. Second, tracking errors can occur because of bad lighting conditions or polluted environments. While most devices in the AR field are compatible with smart glasses, smart glasses are too heavy for daily tasks and not sufficiently reliable and affordable for efficient rollouts in small and medium-sized enterprise (SME) environments.

There are currently various technical solutions on the market for remote guidance functionalities. However, these solutions only work when a stable Internet connection is established. It is impossible to record service cases offline and synchronize them with the cloud once a user is online again. Thus, there is a need for solutions that can be downloaded and followed even if there is no Internet connection in the field. There is also a need for a combination of instructions and real-time guidance currently not offered on the market.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment, a robot is provided. The robot may include a plurality of sensors, a communication unit, and a processor. The processor may be configured to collect sensor data from the plurality of sensors. The sensor data may be related to a task being performed by the robot based on an AI model. The AI model may include a trained neural network. The processor may be configured to determine, based on the sensor data and the artificial AI model, that a probability of completing the task is below a threshold. The determination that the probability of completing the task is below the threshold may include determining that a time for completing the task exceeds a pre-determined value. The probability of completing the task may be determined based on a distribution of levels of outputs of the trained neural network.

In response to the determination that the probability of completing the task is below the threshold, the processor may send, via the communication unit, a request for operator assistance to a remote computing device. The request for the operator assistance may include a message describing the task in one or more human languages. In response to sending the request, the processor may receive, via the communication unit, teleoperation data from the remote computing device. Based on the teleoperation data, the processor may cause the robot to execute the task. The task may include the AI model locating an object in a working environment of the robot based on an image received from the plurality of sensors. The teleoperation data may include a clue indicative of the location of the object in the image. In a further example embodiment, the task may include determining, based on the sensor data, a direction to an object with respect to the robot and a distance from the robot to the object in a working environment of the robot. The teleoperation data may include information regarding the direction to the object with respect to the robot and the distance from the robot to the object. In some example embodiments, the task may include grasping, based on the sensor data, an object in a working environment of the robot by a manipulator of the robot. The teleoperation data may include information regarding commands for one or more actuators of the manipulator.

The processor may be further configured to generate training data for updating the AI model. The training data may be generated based on the sensor data and results of executing the task. The training data may include a part of the sensor data. The part of the sensor data may be collected during a period of a predetermined length that precedes the determination that the probability of competing the task is below the threshold.

The trained neural network may be partially trained based on further training data. The further training data may be collected from a plurality of user devices. The plurality of user devices may be operated by a plurality of users to control a virtual robot to execute a plurality of tasks.

According to another embodiment, a method for training of robots is provided. An example method may commence with collecting, by a processor of the robot, sensor data from a plurality of sensors of the robot. The sensor data may be related to a task being performed by the robot based on an AI model. The method may further include determining, based on the sensor data and the AI model, that a probability of completing the task is below a threshold. The method may continue with sending, in response to the determination that the probability of completing the task is below the threshold, a request for operator assistance to a remote computing device. In response to sending the request, teleoperation data may be received by the processor from the remote computing device. The method may further include causing the robot to execute the task based on the teleoperation data. The method may continue with generating training data for updating the AI model. The training data may be generated based on the sensor data and results of the executing the task.

According to yet another aspect of the disclosure, there is provided a non-transitory processor-readable medium, which stores processor-readable instructions. When the processor-readable instructions are executed by a processor, they cause the processor to implement the above-mentioned method for training of robots.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The methods and system of the present disclosure are based on the combination of various technological approaches as, e.g., real-time remote communication protocols, simulation and AI templates for robotic applications, and application programming interfaces (APIs) between AI-driven controllers to real robots. Embodiments of the present disclosure relate to a machine learning framework that is training neuronal networks to interact with objects in simulations and the real world. Certain embodiments of the present disclosure provide an AI fallback system to back up AI-driven errors and solve them in real-time by using remote control by human operators.

The methods and system of the present disclosure relate to generation of reliable training data by generating data in the robot simulation and optimizing the data through remote control input data through robot navigators.

Some embodiments of the present disclosure allow training robots in a simulation environment using mobile phones. Specifically, a plurality of users may use user devices (e.g., mobile phones) for controlling robots remotely by using a remote mechanical approach.

A user may use a user device to control a robot. Specifically, a plurality of tasks (e.g., grasping an item using a robot) may be developed and the user executes the tasks by controlling the robot using the user device. The tasks may be provided in an application running on the user device. A plurality of tasks may be added to the application. The users may practice controlling robots (either a virtual robot in the application or a real physical robot to which the user device can connect remotely). All data related to controlling the robot may be collected by a server and further analyzed to determine whether the problems were successfully solved by the users. In other words, data on successful runs or unsuccessful runs of the robot may be collected.

Additionally, virtual robots may be trained in a cloud simulation. Twenty to fifty million training datasets where a virtual robot tries different approaches and different ways of grasping may be generated for a predetermined period of time. Additionally, physical robots may be controlled to execute tasks. Therefore, training data may be collected based on controlling the robots using the application running on the user device, training virtual robots in a cloud simulation environment, and training physical robots. Specifically, training data may be acquired through simulated and real robot applications and processed based on fusion of information received from several sensors (e.g., tactile, optical, ultrasonic, etc.) as well as remote control services.

The collected training data may be analyzed. Based on the analysis, robot operation scenarios may be developed. The reinforcement learning approach may be used, according to which training data may be acquired from a scalable simulation environment.

Some embodiments of the present disclosure may allow recording service cases offline and synchronizing the service cases with the cloud once the user is again online. Solutions can be downloaded and followed even if there is no Internet connection in the field. The systems and methods focus on a wide range of user devices and support multiple AR devices.

Some embodiments of the present disclosure may allow facilitating full automation of task for walking to shelves and picking an object from the shelves. Currently this task is performed by a human worker. This method is flexible but also expensive due to costs of salaries. Some current solutions involve a mobile robot. The mobile robot may bring the shelves to the pickers and after the product is picked by a human worker, the mobile robot may bring the shelf to its previous place. By bringing the shelves to the pickers, the expensive part of a human worker walking to the shelves is solved but there are still pickers needed. This approach is flexible but requires expenses for a mobile shelf transport robot system and costs for salaries of the human workers.

Embodiments of the present disclosure provide a module-based software platform for smart picking tasks by robots in warehouses. The platform is based on self-developed technologies as real-time communication from an AR Service, a physics-based cloud simulation environment, and a neural network framework and consists of three main parts:

AI Sim Module

AI Sim is a cloud-based simulation environment where customers can upload their new products and simulate the behavior of grasping tasks of a picking robot. The control of the robots for interacting with the products can be run by pre-defined neural networks or remote human navigators. Cloud-based simulation services may be offered per simulation minutes (e.g., simulation server with 100 parallel sessions for a predetermined price per minute) and per server dataset packages (50,000 simulation runs for a predetermined price).

AI Control Module

AI Control enables humans (so-called robot navigators) to remotely control robots in real-time from all around the world. A human navigator sees what the robot is doing based on video and sensor data and can control the robot in real-time through a controlling device like a 6D mouse or a smartphone application. The remote control enables a flexible and precise navigation of the robot to achieve successful picks of the products. The data collected through the interaction remote control can additionally be used to train the neuronal networks, which shall control the robot in the long-term. Also, the remote control may be used as a fallback strategy if the AI cannot solve the picking tasks itself.

In detail, AI Control may include a remote control application that can be downloaded by a robot navigator. The robot navigator can acquire a certificate to control real robots and earn money per each completed task (e.g., successfully grasping objects). The certification is for free and runs fully-automated in a gamification mode on simulated robots.

AI Skills Module

AI Skills includes a multitude of pre-trained neural networks for several picking situations (e.g., picking, unscrewing screws out of a box, approaching an object, and so forth).

In an example embodiment, a robot may include a plurality of sensors, a communication unit, and a processor. The processor may be configured to collect sensor data from the plurality of sensors. The sensor data may be related to a task being performed by the robot based on an AI model. The processor may be configured to determine, based on the sensor data and the artificial AI model, that a probability of completing the task is below a threshold. In response to the determination that the probability of completing the task is below the threshold, the processor may send, via the communication unit, a request for operator assistance to a remote computing device. In response to sending the request, the processor may receive, via the communication unit, teleoperation data from the remote computing device. Based on the teleoperation data, the processor may cause the robot to execute the task. The processor may be further configured to generate training data for updating the AI model. The training data may be generated based on the sensor data and results of the executing the task.

Figure 1:
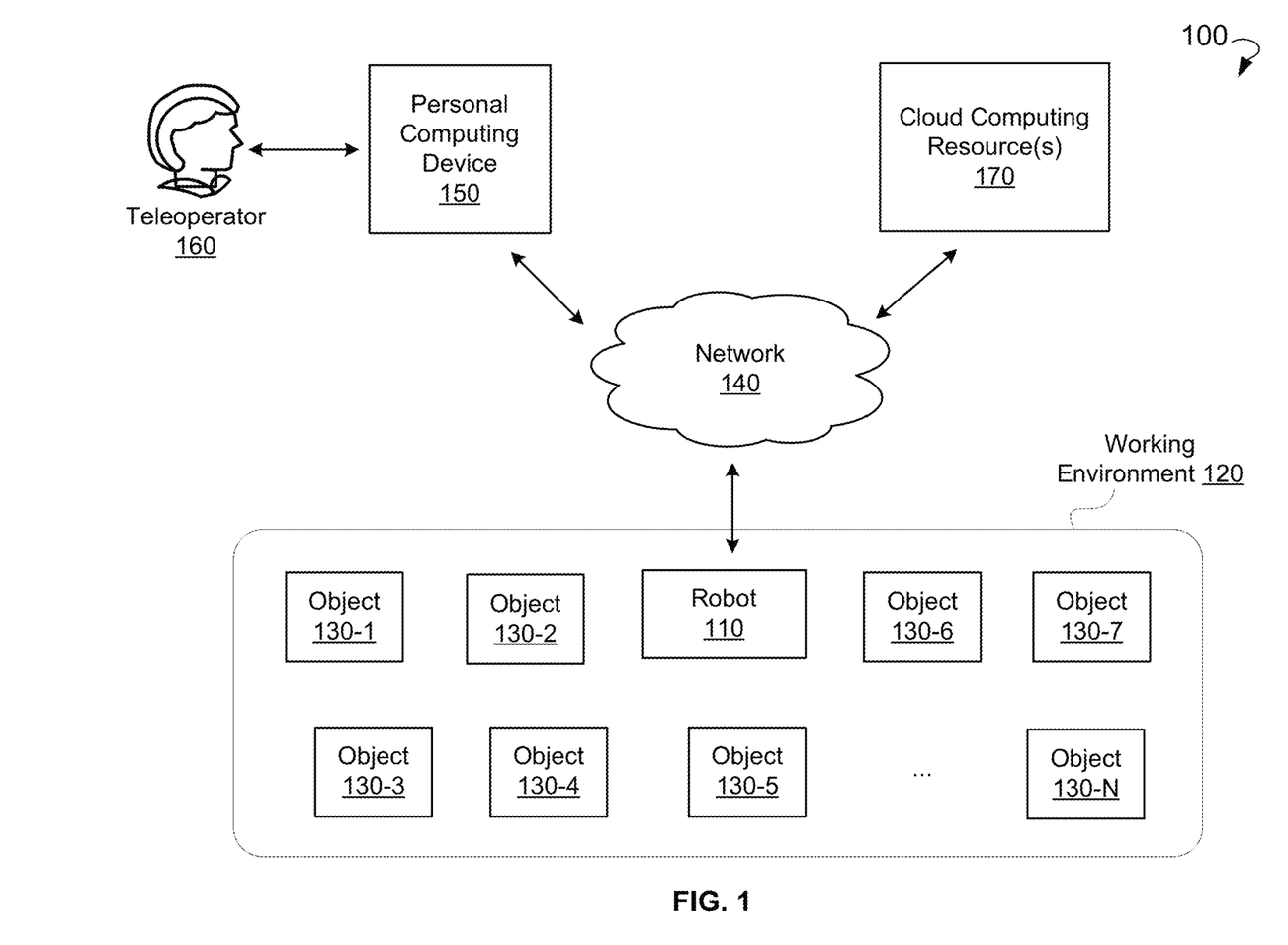
FIG. 1 illustrates an environment within which systems and methods for backup control based continuous training of robots can be implemented.

FIG. 1 illustrates an environment 100 within which systems and methods for backup control based continuous training of robots can be implemented. The environment 100 may include a robot 110, a working environment 120 of the robot 110, objects 130-1 . . . 130-N in the working environment 120, a personal computing device 150 operated by a teleoperator 160, cloud computing resources 170, and a network 140. The working environment 120, personal computing device 150, and the cloud computing resources 170 may communicate with the network 140.

The network 140 may include the Internet, a computing cloud, and any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 140 can further include or interface with any one or more of Recommended Standard 232 (RS-232) serial connection, an IEEE-1394 (FireWire) connection, a Fiber Channel connection, an IrDA (infrared) port, a Small Computer Systems Interface connection, a Universal Serial Bus connection or other wired or wireless, digital or analog interface or connection, mesh or Digi® networking. The network 140 may include a network of data processing nodes, also referred to as network nodes, that are interconnected for the purpose of data communication.

The teleoperator 160 may include a person that provides operator assistance to the robot 110 using the personal computing device 150. In some embodiments, the personal computing device 150 may include a PC or a handheld microprocessor device, such as a smartphone or a tablet computer. The personal computing device 150 can receive commands from the teleoperator 160 via input units of the personal computing device 150, retrieve stored information from the cloud computing resources 170, and send data to the cloud computing resources 170 for further processing and storage.

The robot 110 may operate and execute tasks in the working environment 120. The working environment 120 may be physical, such as a building, a room, a street, or virtual, such as a cloud-based simulation environment. The working environment 120 may have a plurality of objects 130-1 . . . 130-N. In the physical environment, the objects may include physical objects placed into the physical environment. In the cloud-based simulation environment, the objects may include virtual objects placed into the cloud-based simulation environment. In an example embodiment, the robot 110 may be configured to receive tasks from the teleoperator 160 in natural language, such as "Robot, please get me a bottle of water" or "Hey, robot. What's the weather like today?" The robot 110 may interact with the teleoperator 160 and may provide responses to the teleoperator 160, like "Today the temperature is 25 degrees C.," and may find, grasp, and bring objects, such as a bottle of water, to the teleoperator 160.

The cloud computing resources 170 may include one or more cloud-based servers. The cloud computing resources 170 may process and store information received from the personal computing device 150 and the working environment 120.

Figure 2:
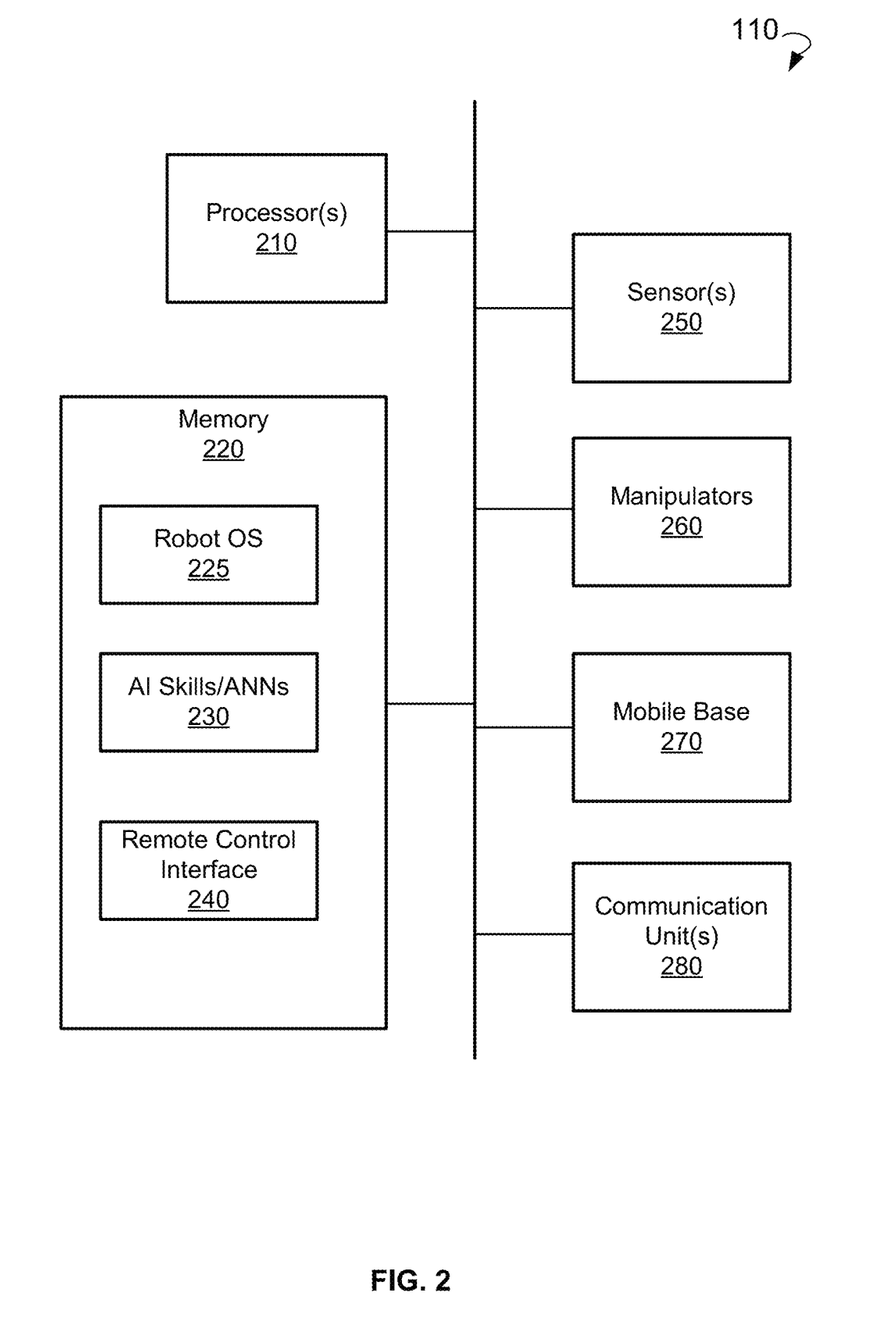
FIG. 2 is a block diagram showing a robot, according to an example embodiment.

FIG. 2 is a block diagram showing a robot, according to an example embodiment. In the illustrated embodiment, the robot 110 may include one or more processors 210, a memory 220, one or more sensors 250, manipulators 260, a mobile base 270, and one or more communication units 280. A robot operating system (OS) 225, AI skills/ANNs 230, and a remote control interface 240 may be stored in the memory 220. The AI skills/ANN 230 are also referred herein to as ANNs 230. In other embodiments, the robot 110 includes additional or other components necessary for operations of the robot 110. Similarly, in certain embodiments, the robot 110 includes fewer components that perform functions similar or equivalent to those depicted in FIG. 2.

In various embodiments, the processors 210 include hardware and/or software, which is operable to execute instructions stored in the memory 230. The processors 210 may perform analyzing sensor data received from sensors and providing the sensor data to the AI skills/ANNs 230, processing telecommunication data received from a teleoperator, and executing a task based on the sensor data and the telecommunication data. The processors 210 may include general purpose processors, video processors, audio processing systems, and so forth.

In various embodiments, the communication units 280 can be configured to communicate with a network such as the Internet, WAN, LAN, cellular network, and so forth, to receive the sensor data and/or the telecommunication data. The received sensor data and/or telecommunication data may be then forwarded to the processors 210 for further analysis.

The robot OS 225 may control the operation of the robot 110 and control all elements of the robot 110. Specifically, the robot OS 225 may receive commands and execute the commands using the ANNs 230 and analyze the outputs of the ANNs 230. If an output is uncertain (i.e., when the probability of execution of the task is below a threshold), the robot OS 225 may send a request for operator assistance to a remote computing device. The teleoperator may make a decision based on the outputs of the ANNs 230. For example, if two outputs of the ANNs 230 have the same probability, or neither of the outputs has a probability higher than the threshold, the teleoperator may select which output to use for determining the command for the robot 110. In an example embodiment, the probability of an output can be determined as a level of an output divided by a sum of levels of all outputs.

Figure 3:
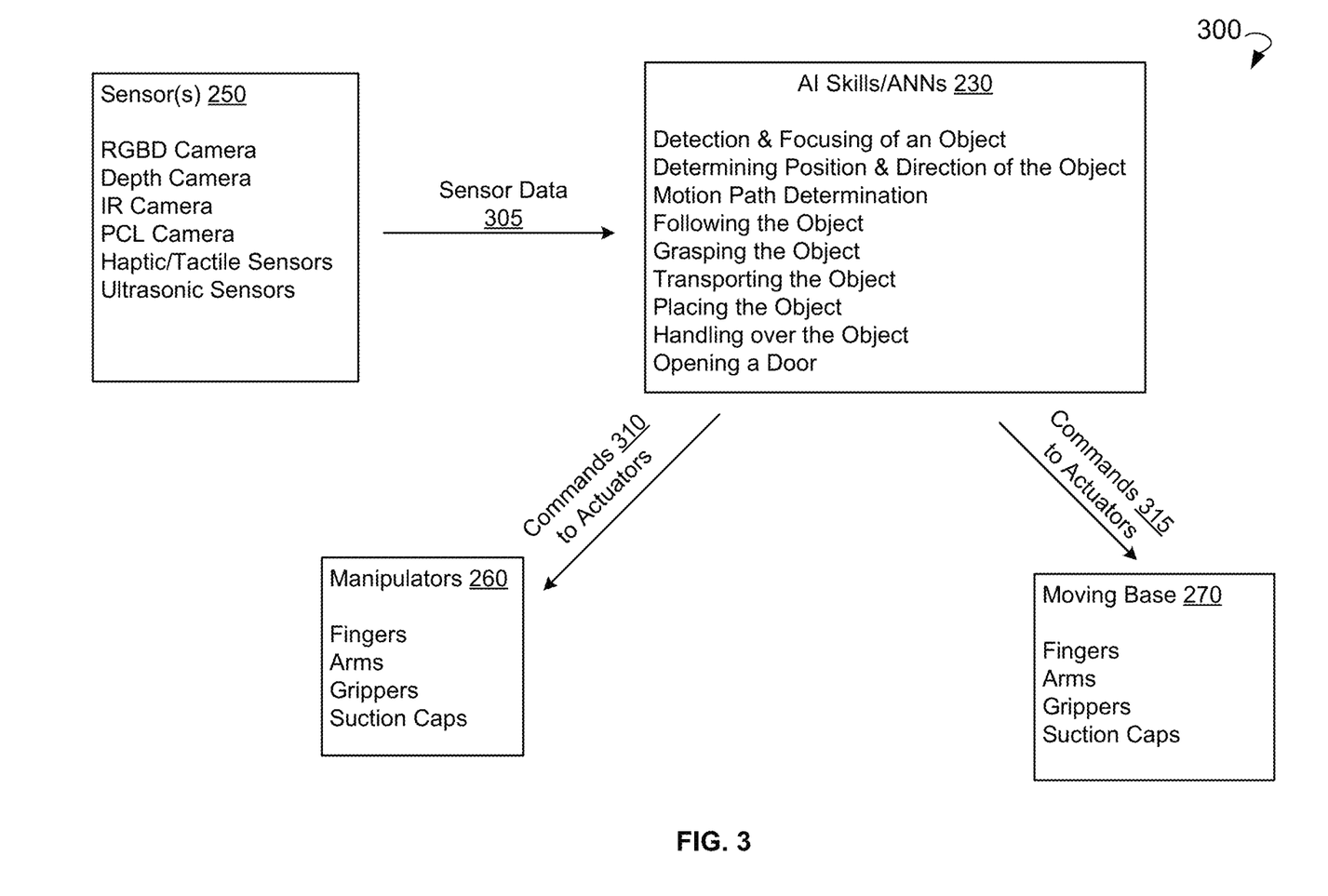
FIG. 3 is a block diagram showing functionalities of artificial neural networks implemented in a robot, according to an example embodiment.

The ANNs 230 process the sensor data 305 received from sensors 250 and provide commands 310 of FIG. 3 to actuators of the robot 110. The sensors 250 of the robot 110 may include a Red, Green, Blue plus Depth (RGBD) camera, a depth camera, an infrared (IR) camera, a Point Cloud Library (PCL) camera, haptic/tactile sensors, ultrasonic sensors, and so forth.

In an example embodiment, the same parameter may be calculated by different types of sensors to provide several types of information. The selection of one or more sensors for determining a specific parameter may be based on predetermined criteria. For example, a distance to an object may be determined based on sensor data received from a depth camera. In another example embodiment, the distance to the object may be calculated based on the sensor data received from an ultrasonic sensor. The sensors 250 may be configured to measure a distance, a color, a temperature, a shape, a presence/absence of an object, a route, and many other parameters related to objects and the working environment.

The manipulators 260 of the robot 110 may include fingers, arms, grippers, suction caps, and so forth. A mobile base 270 of the robot 110 may be configured to move the robot 110 in the working environment and may include, for example, wheels, caterpillar tracks, and other means for moving the mobile base 270.

The remote control interface 240 may provide a telecommunication service for the remote control of the robot 110. A teleoperator may use the remote control interface 240 to review sensor data collected by sensors 250, such as sensor readings and images taken by cameras, and may manually create commands for the robot 110 to solve the task. The teleoperator may send the commands to the robot via the remote control interface 240. In an example embodiment, a telecommunication service such as a Web Real Time Communications (WebRTC) service may be used as the remote control interface 240.

FIG. 3 is a block diagram 300 showing functionalities of ANNs implemented in a robot, according to an example embodiment. The ANNs 230 receive sensor data 305 from sensors 250. The ANNs 230 process the sensor data 305 and provide commands 310 to actuators of the robot, such as manipulators 260 (e.g., fingers, arms, grippers, suction cups, and so forth) and provide commands 315 to further actuators of the robot, such as a mobile base 270, which may also include fingers, arms, grippers, suction caps, and so forth. The sensors 250 may include a RGBD camera, a depth camera, an IR camera, a PCL camera, haptic/tactile sensors, ultrasonic sensors, and so forth. One ANN of the ANNs 230 describes one AI skill of the robot. The AI skills may include detection of an object and focusing on the object, determining position from the robot to the object and direction to the object with respect to the robot, determination of motion path to the object, determination of the object, following the object, grasping the object, transporting the object, placing the object, handing over the object, opening a door, and so forth.

In an example embodiment, combinations of different ANNs 230 may be used for processing the sensor data 305 and generating commands 310. For example, one ANN of the ANNs 230 may be used for detecting an object and the other ANN of the ANNs 230 may be used for estimating the distance to the object. Different ANNs 230 may have different latencies. For example, when only the detection of an object is needed, the detection takes 70 milliseconds for one of the ANNs 230. After the object is detected and tracking of the object is needed, several ANNs 230 may be used to track the object, e.g., based on the contrast determined by the sensors.

Figure 4:
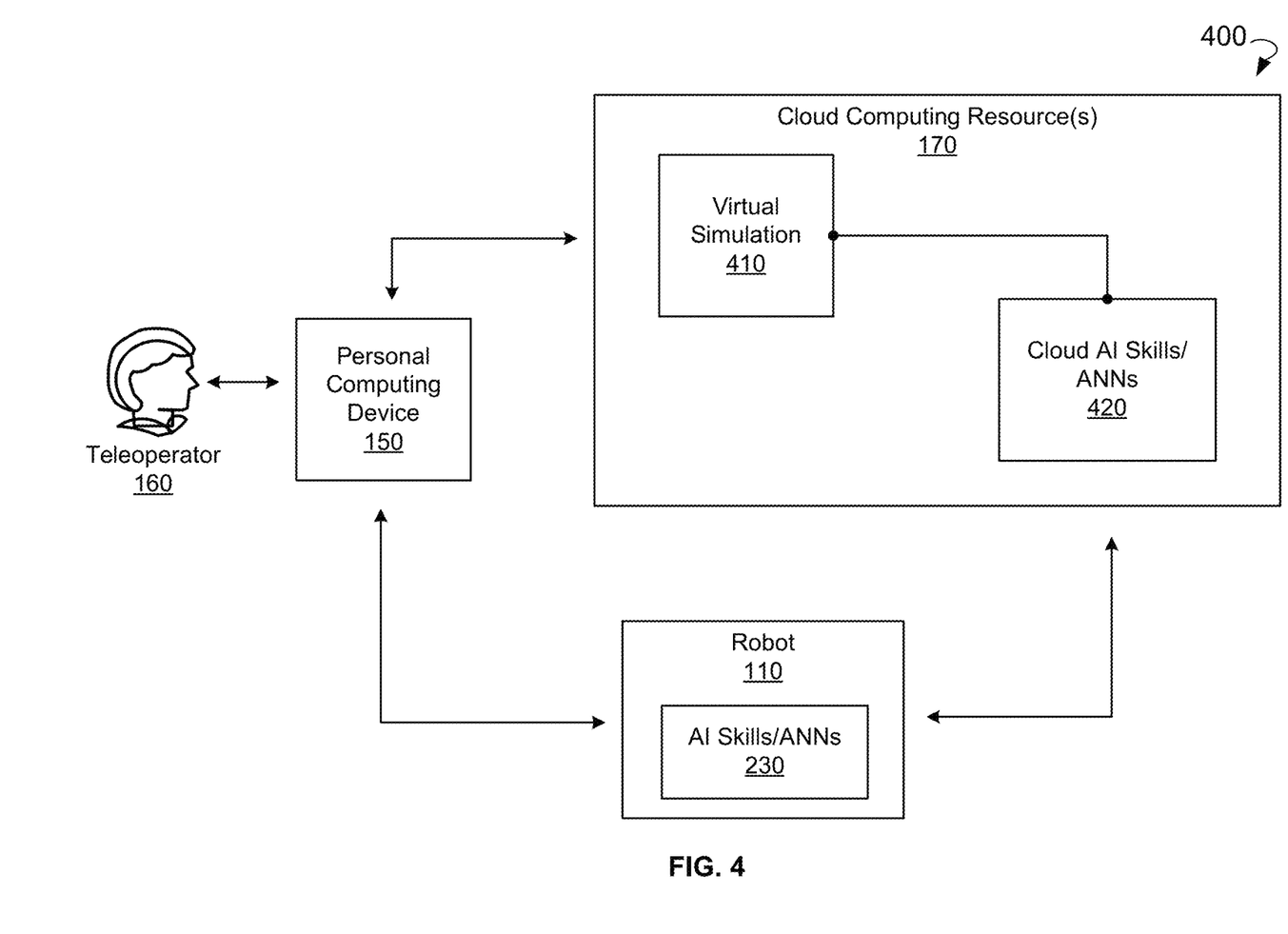
FIG. 4 is a block diagram showing a system for backup control based continuous training of robots, according to some example embodiment.

FIG. 4 is a block diagram showing a system 400 for backup control based continuous training of robots, according to some example embodiments. The system 400 may include a robot 110, a personal computing device 150 for remote communication with the robot 110, and cloud computing resources 170. The personal computing device 150 may be controlled by a teleoperator 160.

The teleoperator 160 may send tasks to the robot 110 via the personal computing device 150. The teleoperator 160 may provide the task to the robot 110 in a form understandable by the robot 110. In an example embodiment, the task may be in a form of a command sent via the personal computing device 150, a verbal input of the teleoperator 160, e.g., in native language, and so forth.

Upon receiving a task, the robot 110 may use sensors to collect sensor data related to the task performed by the robot 110. The robot 110 may use an AI model to determine a probability of completing the task. Specifically, the robot 110 may use the AI Skills/ANNs 230 to analyze the sensor data and determine, based on the AI model, the probability of completing the task. The robot 110 may select one of the AI Skills/ANNs 230 needed to analyze the sensor data and perform the task. In some embodiments, a specific AI Skills/ANNs 230 may be selected based on the type of the task. For example, a specific AI Skills/ANNs 230 associated with a gripping skill may be selected if the task is "Bring a bottle of water."

The robot 110 may interact dynamically with a working environment of the robot 110. If the working environment changes, the robot 110 can use the AI Skills/ANNs 230 to dynamically adapt to the changed working environment. The determination that the working environment has changed may be made based on the sensor data received during the operation of the robot 110.

Based on the received task, the robot 110 may start execution of the task. When a processor of the robot 110 determines that the probability of completing the task is below the threshold, the robot 110 sends a request for operator assistance to the personal computing device 150. The teleoperator 160 may receive the request from the robot 110 and either manually operate the robot 110 or find mistakes in the operation of the robot and send correct teleoperation data to the robot 110.

The robot 110 may also send the request for operator assistance when there is a timeout in the execution of the task, if a predetermined object (e.g., a child) is detected in the working environment, if an object is damaged during the execution of the task, if a command cannot be performed for a predetermined period of time or predetermined number of times, and so forth.

In response to sending the request for operator assistance, the processor of the robot 110 may receive the teleoperation data from the personal computing device 150 of the teleoperator and cause the robot to execute the task based on the teleoperation data and the sensor data.

The sensor data and results of the executing the task may be used to generate training data for updating the AI model and updating the AI skills. The training data may include sensor data recorded from the time of receiving the task until the successful execution or failure of the task and the results of execution (failure/success).

During the training process, continuous learning, machine learning, and user interface (UI) learning may be used. Errors may be identified and corrected for the future so that in the future the probability of the same error may be lower for a similar situation/task.

In an example embodiment, the training data may further include sensor data recorded during the last few seconds until a successful task execution or a failure is recorded. These training data may be stored in a memory, for example, in a Robot Operating System bag (ROSBAG).

The system 400 may have virtual AI Skills/ANNs 420 stored in the cloud computing resources 170. The virtual AI Skills/ANNs 420 may be used to perform virtual simulation 410 of tasks. During the virtual simulation 410, the execution of tasks by the robot 110 is simulated in the cloud computing resources 170 using the virtual AI Skills/ANNs 420. The results of the virtual simulation 410 may be added to the training data. The AI model used for execution of the tasks by the robot 110 may be updated based on the training data obtained upon the virtual simulation 410 of execution of tasks. The updated AI model may be used for operation and training of physical robots in a real-world environment.

In an example embodiment, the teleoperator 160 needs to be certified before the teleoperator 160 is allowed to operate a physical robot, such as the robot 110. The virtual simulation 410 may be used to train the teleoperator 160 to control the robot 110. The teleoperator 160 may perform tasks in a cloud-based simulation environment using the virtual simulation 410 and may learn on successful/unsuccessful completion of tasks. The successful execution of a task may be determined based on predetermined criteria. For example, metrics/thresholds of the success of the task execution may be predetermined. Based on the analysis of the sensor data during the task execution and the metrics/thresholds of the success of the task execution, the execution of the task may be determined to be successful or unsuccessful.

In an example embodiment, a plurality of teleoperators from all around the world may connect to the robot or to the cloud-based simulation environment and execute a plurality of tasks to generate training data. Also, the plurality of teleoperators may be trained to control the robot and may be certified based on the results of the training.

During the training, a teleoperator may select an AI skill, e.g., taking of a bottle. The teleoperator may provide commands to the robot and may operate the robot to execute the task, such as navigate the robot, control the mobile base and manipulators of the robot to grasp the bottle, and the like. During the operation of the robot, all sensor data, and results of execution of the task (success/failure) may be collected and used for generating the training data.

In another embodiment of training of the robot, the robot may perform the task by itself and the teleoperator may manually help the robot to focus on the bottle and to correct the directory of the robot if the teleoperator sees that the robot fails at some moment of execution of the task.

In an example embodiment, only the local version of the AI Skills/ANNs 230 of the robot 110 can be trained. In a further example embodiment, a global version of AI Skills/ANNs stored in a cloud can be trained and the local version of the AI Skills/ANNs 230 can be then synchronized with the global version of the AI Skills/ANNs.

In some embodiments, the local version of the AI Skills/ANNs 230 may be divided into several portions. The first portion of the AI Skills/ANNs 230 may be continuously or periodically synchronized with the global version of AI Skills/ANNs stored in the cloud. The second portion of the AI Skills/ANNs 230 may include a private portion of the AI Skills/ANNs 230, which an owner of the robot does not want to be uploaded to the cloud for security or other reasons. The private portion of the AI Skills/ANNs 230 may be updated based on training data generated based on execution of tasks by the robot 110. In other words, the owner of the robot 110 may use the global version of AI Skills/ANNs and may additionally have a portion of the AI Skills/ANNs 230 stored on the robot 110 or in a private network and not uploaded to the cloud. The owner may update the private portion of the AI Skills/ANNs 230 based on execution of tasks specific for the business of the owner.

Figure 5:
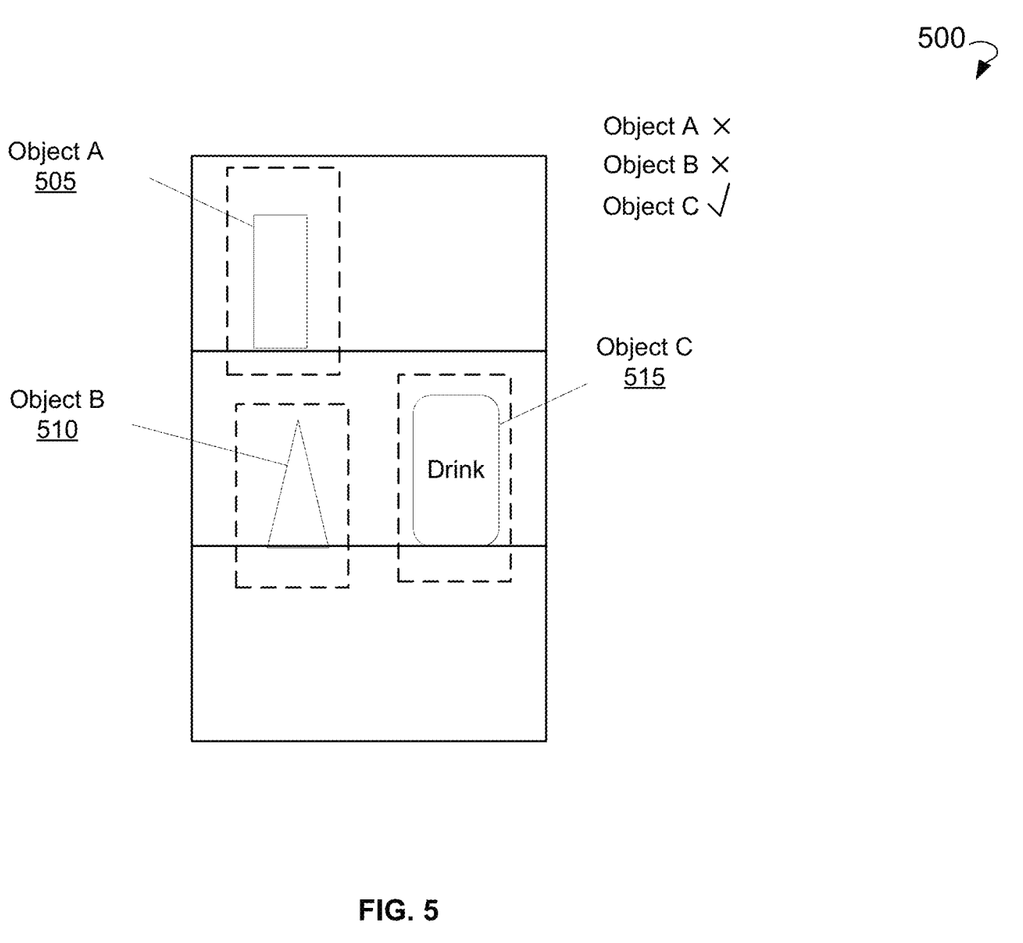
FIG. 5 is a block diagram showing a task for focusing on an object, according to an example embodiment.

FIG. 5 is a block diagram showing a task 500 for focusing on an object, according to an example embodiment. A teleoperator may request a robot to bring a bottle from a refrigerator. First, the robot may be trained to differentiate objects. When the robot is located near the refrigerator and a camera of the robot is directed to all objects present in the refrigerator, the teleoperator may use an image or a video captured by the camera to label each of the objects. For example, the teleoperator may select each object on the image or the video and type or pronounce a label of the object, such as "This is a bottle." The association between the appearance of the objects and their labels may be stored to the ANNs. Labeling the objects may be a part of training the robot to differentiate objects.

Then, the teleoperator may provide a command to grasp a bottle of water. The robot may start performing the task using visual analytics and sensor analytics. The robot may analyze visual appearance of object A 505, object B 510, and object C 515 in the refrigerator. Upon finding the object C 515 that is identical or similar to a pre-defined object "drink," the robot may determine that the identified object C 515 is the bottle and proceed with the grasping operation.

If the robot determines that the probability that at least one of the object A 505, object B 510, and object C 515 is a bottle is below a predetermined threshold, e.g., 0.6, the robot may determine that the robot fails to identify the object and may send a request for the operator assistance. The teleoperator may manually show the object C 515 and label the object C 515 as "a bottle." For example, the teleoperator may physically point to the bottle when the teleoperator is close to the robot or may identify the bottle on the image taken by the camera of the robot. The robot may store the association between the object C 515 shown by the teleoperator and the label "bottle" to the ANNs and then proceed with the grasping operation to grasp the object C 515. All collected sensor data and the resulting selection of the object C 515 can be used as training data to update the ANNs.

Figure 6:
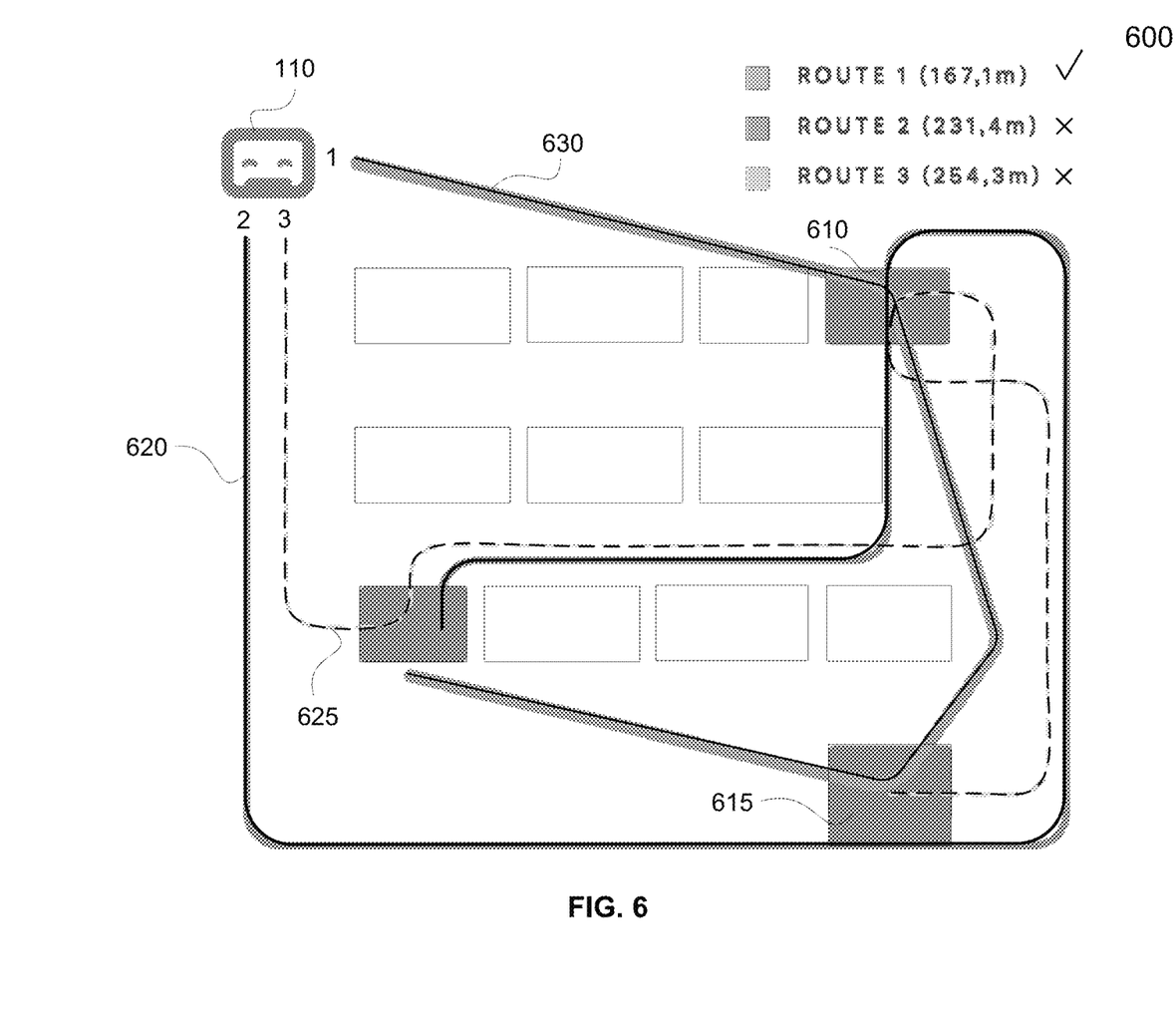
FIG. 6 is a block diagram showing a task for determining a path to an object, according to an example embodiment.

FIG. 6 is a block diagram showing a task 600 for determining a route to an object, according to an example embodiment. A teleoperator may provide a command to a robot 110 to visit object 605, object 610, and object 615 in a working environment in any order by using an optimal route (e.g., the shortest route). The robot may receive the command, analyze the sensor data collected in the working environment, and determine the route. For example, the robot 110 may generate two routes determined by the robot 110 to be the most optimal. Route 620 (also shown as route 2) may include going to the object 615, then going to the object 610, and then going to the object 625. The length of the route 620 may be 231.4 m. Object 625 (also shown as route 3) generated by the robot 110 may include going to the object 625, then going to the object 610, and then going to the object 615. The length of the route 620 may be 254.3 m. Upon generating the routes 620 and 625, the robot 110 may send the routes 620 and 625 to the teleoperator. The teleoperator may receive data associated with the routes 620 and 625 and determine whether any of the routes 620 and 625 is the most optimal route. The teleoperator may determine that at least one more route exists that is shorter that each of the routes 620 and 625. The route 630 (also shown as route 1) may include going to the object 610, then going to the object 615, and then going to the object 625 and may be 167.1 m long. Upon determining that the route 630 is the most optimal route, the teleoperator may guide the robot 110 according to the route 630. The robot 110 may record the sensor data, directions, and distances during travelling according to the route 630 as training data and use the collected training date for updating the ANNs.

Figure 7:
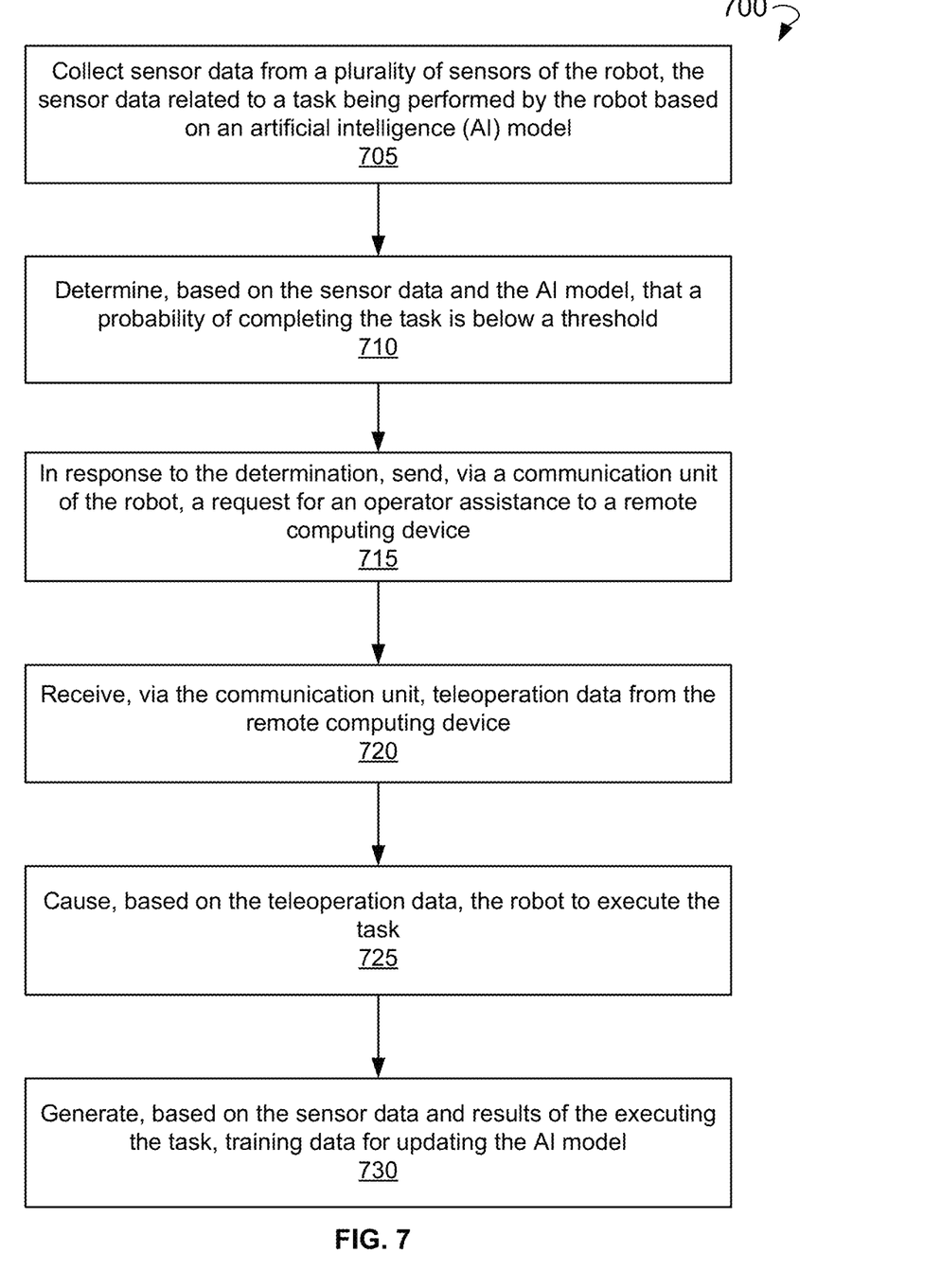
FIG. 7 is a flow chart showing a method for backup control based continuous training of robots, according to some example embodiments.

FIG. 7 is a flow chart showing a method 700 for backup control based continuous training of robots, according to some example embodiments. The method 700 may commence with collecting, by a processor of the robot, sensor data from a plurality of sensors of the robot at operation 705.

The sensor data may be related to a task being performed by the robot based on an AI model. The method 700 may further include determining, based on the sensor data and the AI model, that a probability of completing the task is below a threshold at operation 710. In an example embodiment, the AI model may include a trained neural network. The determination that the probability of completing the task is below the threshold may include determining that a time for completing the task exceeds a pre-determined value. The probability of completing the task may be determined based on a distribution of levels of outputs of the trained neural network.

The method 700 may continue with sending, in response to the determination that the probability of completing the task is below the threshold, a request for operator assistance to a remote computing device at operation 715. The request for operator assistance may include a message describing the task in one or more human languages. In response to sending the request, teleoperation data may be received by the processor from the remote computing device at operation 720.

The method 700 may further include causing the robot to execute the task based on the teleoperation data at operation 725. In an example embodiment, the task may include locating, by the AI model and based on an image received from the plurality of sensors, an object in a working environment of the robot. The teleoperation data may include a clue indicative of the location of the object in the image. In a further example embodiment, the task may include determining, based on the sensor data, a direction to an object with respect to the robot and a distance from the robot to the object in a working environment of the robot. In this embodiment, the teleoperation data may include information regarding the direction to the object with respect to the robot and the distance from the robot to the object. In some example embodiments, the task may include grasping, based on the sensor data, by a manipulator of the robot, an object in a working environment of the robot. In this embodiment, the teleoperation data may include information regarding commands for one or more actuators of the manipulator.

The method 700 may continue with generating training data for updating the AI model at operation 730. The training data may be generated based on the sensor data and results of the executing the task. The training data include a part of the sensor data. The part of the sensor data may be collected during a period of a predetermined length that precedes the determination that the probability of competing the task is below the threshold.

In an example embodiment, the trained neural network may be partially trained based on further training data. The further training data may be collected from a plurality of user devices operated by a plurality of users to control a virtual robot to execute a plurality of tasks.

Figure 8:
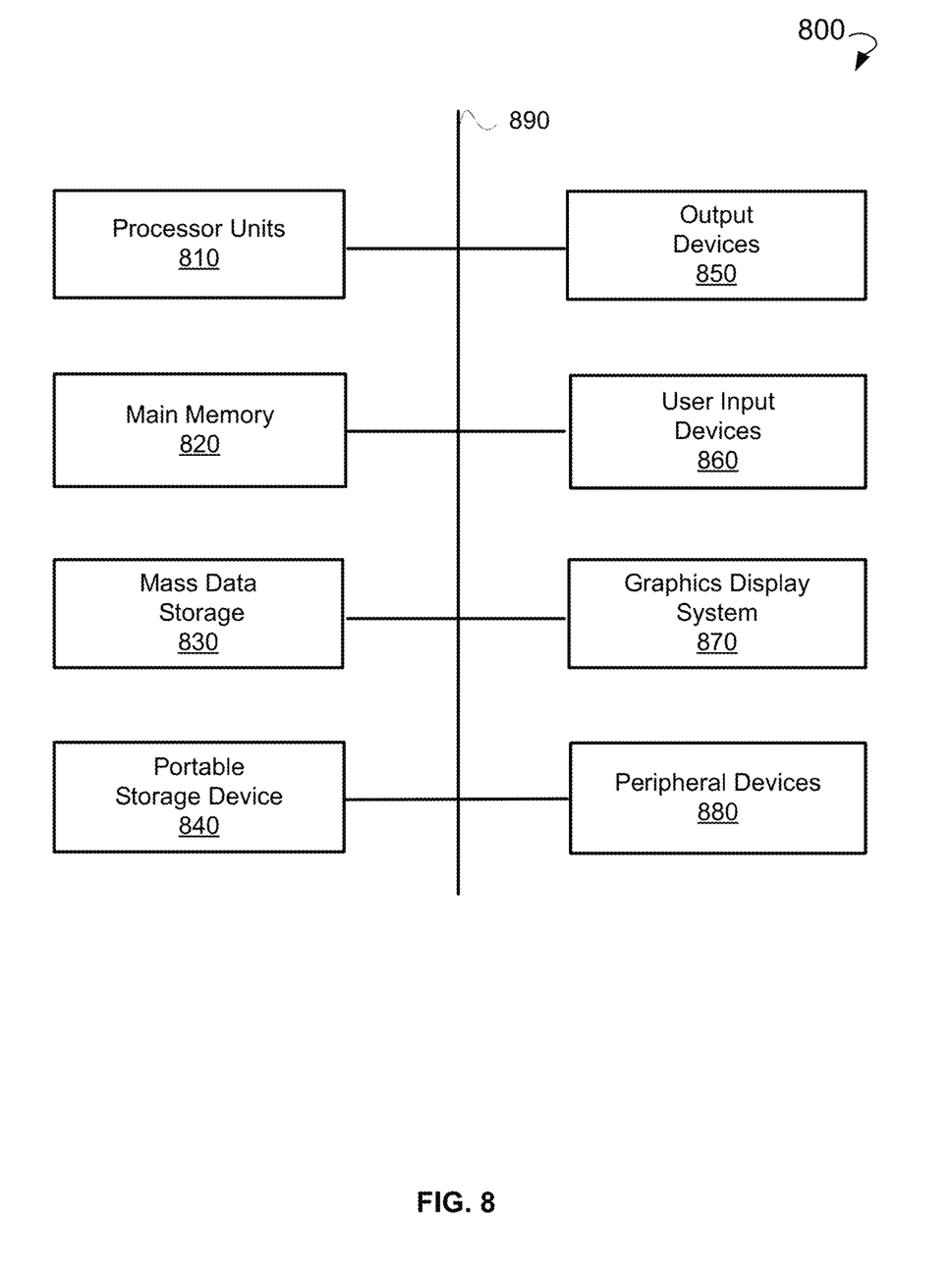
FIG. 8 shows a computer system that can be used to implement a method for backup control based continuous training of robots, according to an example embodiment.

FIG. 8 illustrates a computer system 800 that may be used to implement embodiments of the present disclosure, according to an example embodiment. The computer system 800 may serve as a computing device for a machine, within which a set of instructions for causing the machine to perform any one or more of the methodologies discussed herein can be executed. The computer system 800 can be implemented in the contexts of the likes of network 140, personal computing device 150, and cloud computing resources(s) 170. The computer system 800 includes one or more processor units 810 and main memory 820. Main memory 820 stores, in part, instructions and data for execution by processor units 810. Main memory 820 stores the executable code when in operation. The computer system 800 further includes a mass data storage 830, a portable storage device 840, output devices 850, user input devices 860, a graphics display system 870, and peripheral devices 880. The methods may be implemented in software that is cloud-based.

The components shown in FIG. 8 are depicted as being connected via a single bus 890. The components may be connected through one or more data transport means. Processor units 810 and main memory 820 are connected via a local microprocessor bus, and mass data storage 830, peripheral devices 880, the portable storage device 840, and graphics display system 870 are connected via one or more input/output buses.

Mass data storage 830, which can be implemented with a magnetic disk drive, solid state drive, or an optical disk drive, is a non-volatile storage device for storing data and instructions for use by processor units 810. Mass data storage 830 stores the system software for implementing embodiments of the present disclosure for purposes of loading that software into main memory 820.

The portable storage device 840 may operate in conjunction with a portable non-volatile storage medium, such as a floppy disk, a compact disk, a Digital Versatile Disc (DVD), or a Universal Serial Bus storage device, to input and output data and code to and from the computer system 800. The system software for implementing embodiments of the present disclosure is stored on such a portable medium and input to the computer system 800 via the portable storage device 840.

User input devices 860 may provide a portion of a user interface. User input devices 860 include one or more microphones; an alphanumeric keypad, such as a keyboard, for inputting alphanumeric and other information; or a pointing device, such as a mouse, a trackball, stylus, or cursor direction keys. User input devices 860 can also include a touchscreen. Additionally, the computer system 800 includes output devices 850. Suitable output devices include speakers, printers, network interfaces, and monitors.

Graphics display system 870 may include a liquid crystal display or other suitable display device. Graphics display system 870 may receive textual and graphical information and process the information for output to the display device. Peripheral devices 880 may include any type of computer support device to add additional functionality to the computer system.

The components provided in the computer system 800 of FIG. 8 may include those typically found in computer systems that may be suitable for use with embodiments of the present disclosure and are intended to represent a broad category of such computer components that are well known in the art. Thus, the computer system 800 can be a PC, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 800 may be implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for training robots have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A robot comprising:
a plurality of sensors;
a memory;
a communication unit; and
a processor configured to:
    collect sensor data from the plurality of sensors, the sensor data related to a task being performed by the robot based on an artificial intelligence (AI) model, the AI model including a plurality of trained neural networks stored in the memory;
    determine, based on the sensor data and the AI model, that a probability of completing the task is below a threshold, wherein the probability of completing the task is determined based on a probability of an output of a trained neural network of the plurality of the trained neural networks, the probability of the output being determined as a level of the output divided by a sum of levels of outputs of the trained neural network;
    in response to the determination:
        send, via the communication unit, a request for operator assistance to a remote computing device;
        receive, via the communication unit, teleoperation data from the remote computing device; and
        cause, based on the teleoperation data, the robot to execute the task; and
    generate, based on the sensor data and results of the executing the task, training data for updating the AI model, wherein the plurality of the trained neural networks includes a first neural network and a second neural network, the first neural network being synchronized with a global neural network stored in a cloud-based computing resource and the second neural network being kept in the memory without synchronization with the global neural network.

2. The robot of claim 1, wherein the determining that the probability of completing the task is below the threshold includes determining that a time for completing the task exceeds a pre-determined value.

3. The robot of claim 1, wherein the probability of completing the task is determined based on a distribution of levels of outputs of the trained neural network.

4. The robot of claim 1, wherein the plurality of the trained neural networks is partially trained based on further training data, the further training data being collected from a plurality of user devices, the plurality of user devices being operated by a plurality of users to control a virtual robot to execute a plurality of tasks.

5. The robot of claim 1, wherein the training data include a part of the sensor data, the part of the sensor data being collected during a period of a predetermined length, the period preceding the determination that the probability of competing the task is below the threshold.

6. The robot of claim 1, wherein:
the task includes locating, by the AI model and based on an image received from the plurality of the sensors, an object in a working environment of the robot; and
the teleoperation data include a clue indicative of the location of the object in the image.

7. The robot of claim 1, wherein:
the task includes determining, based on the sensor data, a direction to an object with respect to the robot and a distance from the robot to the object in a working environment of the robot; and
the teleoperation data include information regarding the direction to the object with respect to the robot and the distance from the robot to the object.

8. The robot of claim 1, wherein:
the task includes grasping, based on the sensor data, by a manipulator of the robot, an object in a working environment of the robot; and
the teleoperation data include information regarding commands for one or more actuators of the manipulator.

9. The robot of claim 1, wherein the request for the operator assistance includes a message describing the task in one or more human languages.

10. A method for training a robot, the method comprising:
collecting, by a processor of the robot, sensor data from a plurality of sensors of the robot, the sensor data related to a task being performed by the robot based on an artificial intelligence (AI) model, wherein the AI model includes a plurality of trained neural networks stored in a memory of the robot;

determining, by the processor and based on the sensor data and the AI model, that a probability of completing the task is below a threshold, wherein the probability of completing the task is determined based on a probability of an output of a trained neural network of the plurality of the trained neural networks, the probability of the output being determined as a level of the output divided by a sum of levels of outputs of the trained neural network;

in response to the determination:
  send, by the processor and via a communication unit of the robot, a request for operator assistance to a remote computing device;
  receive, by the processor and via the communication unit, teleoperation data from the remote computing device; and
  cause, by the processor and based on the teleoperation data, the robot to execute the task; and generating, by the processor and based on the sensor data and results of the executing the task, training data for updating the AI model, wherein the plurality of the trained neural networks includes a first neural network and a second neural network, the first neural network being synchronized with a global neural network stored in a cloud-based computing resource and the second neural network being kept in the memory without synchronization with the global neural network.

11. The method of claim 10, wherein the determining that the probability of completing the task is below the threshold includes determining that a time for completing the task exceeds a pre-determined value.

12. The method of claim 10, wherein the probability of completing the task is determined based on a distribution of levels of outputs of the trained neural network.

13. The method of claim 10, wherein the plurality of the trained neural networks is partially trained based on further training data, the further training data being collected from a plurality of user devices, the plurality of user devices being operated by a plurality of users to control a virtual robot to execute a plurality of tasks.

14. The method of claim 10, wherein the training data include a part of the sensor data, the part of the sensor data being collected during a period of a predetermined length, the period preceding the determination that the probability of competing the task is below the threshold.

15. The method of claim 10, wherein:
  the task includes locating, by the AI model and based on an image received from the plurality of the sensors, an object in a working environment of the robot; and
  the teleoperation data include a clue indicative of the location of the object in the image.

16. The method of claim 10, wherein:
  the task includes determining, based on the sensor data, a direction to an object with respect to the robot and a distance from the robot to the object in a working environment of the robot; and
  the teleoperation data include information regarding the direction to the object with respect to the robot and the distance from the robot to the object.

17. The method of claim 10, wherein:
  the task includes grasping, based on the sensor data, by a manipulator of the robot an object in a working environment of the robot; and
  the teleoperation data include information regarding commands for one or more actuators of the manipulator.

18. A non-transitory computer-readable storage medium having embodied thereon instructions, which when executed by one or more processors, perform a method for training a robot, the method comprising:
  collecting sensor data from a plurality of sensors of the robot, the sensor data related to a task being performed by the robot based on an artificial intelligence (AI) model, wherein the AI model includes a plurality of trained neural networks stored in a memory of the robot;
  determining, based on the sensor data and the AI model, that a probability of completing the task is below a threshold, wherein the probability of completing the task is determined based on a probability of an output of a trained neural network of the plurality of the trained neural networks, the probability of the output being determined as a level of the output divided by a sum of levels of outputs of the trained neural network;
  in response to the determination:
    sending, via a communication unit of the robot, a request for operator assistance to a remote computing device;
    receiving, via the communication unit, teleoperation data from the remote computing device;
    causing, based on the teleoperation data, the robot to execute the task; and
  generating, based on sensor data and results of the executing the task, training data for updating the AI model, wherein the plurality of the trained neural networks includes a first neural network and a second neural network, the first neural network being synchronized with a global neural network stored in a cloud-based computing resource and the second neural network being kept in the memory without synchronization with the global neural network.

* * * * *